Aug. 30, 1960  R. C. ZEIDLER  2,950,630
TRANSMISSION
Filed March 16, 1955  7 Sheets-Sheet 1

Inventor:
Reinhold C. Zeidler
By:
H. J. Schmid Atty.

Aug. 30, 1960   R. C. ZEIDLER   2,950,630
TRANSMISSION
Filed March 16, 1955   7 Sheets-Sheet 2
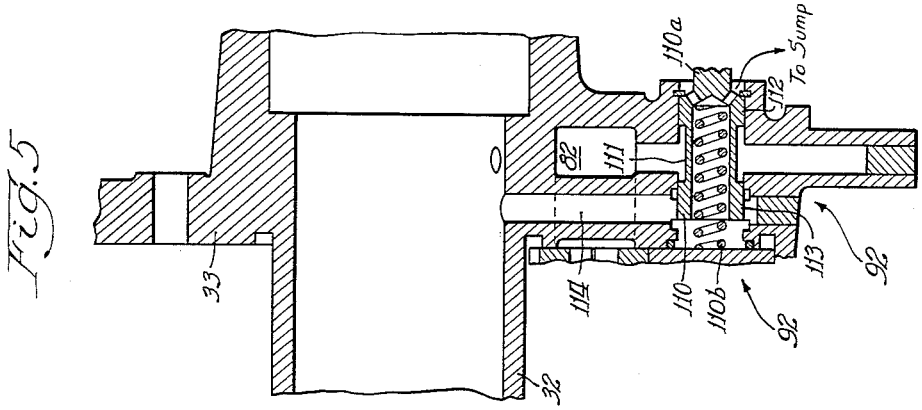
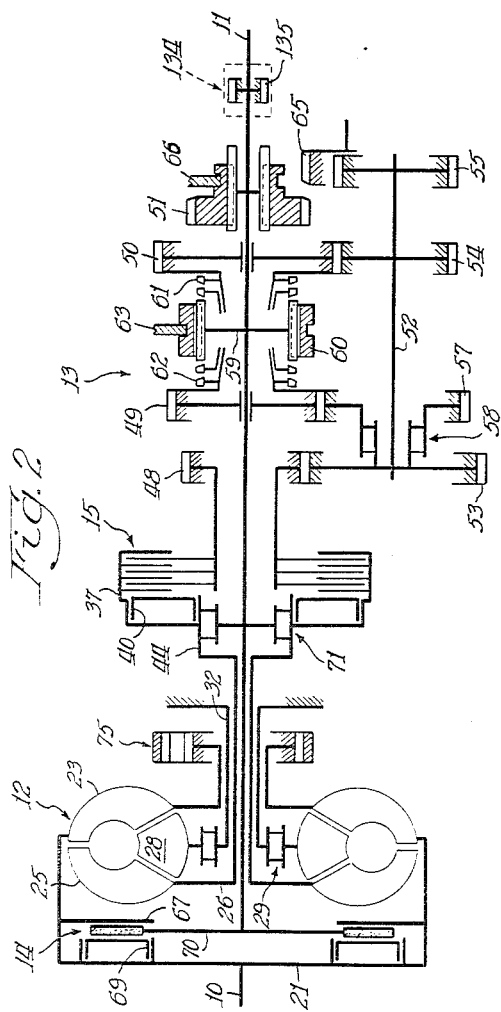
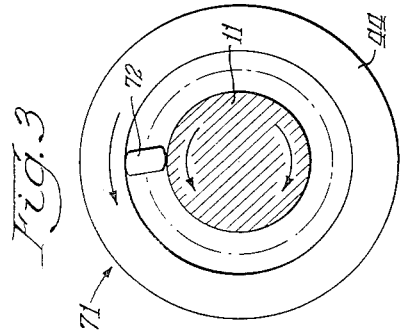
Inventor:
Reinhold C. Zeidler
By: A. J. Schmid Atty.

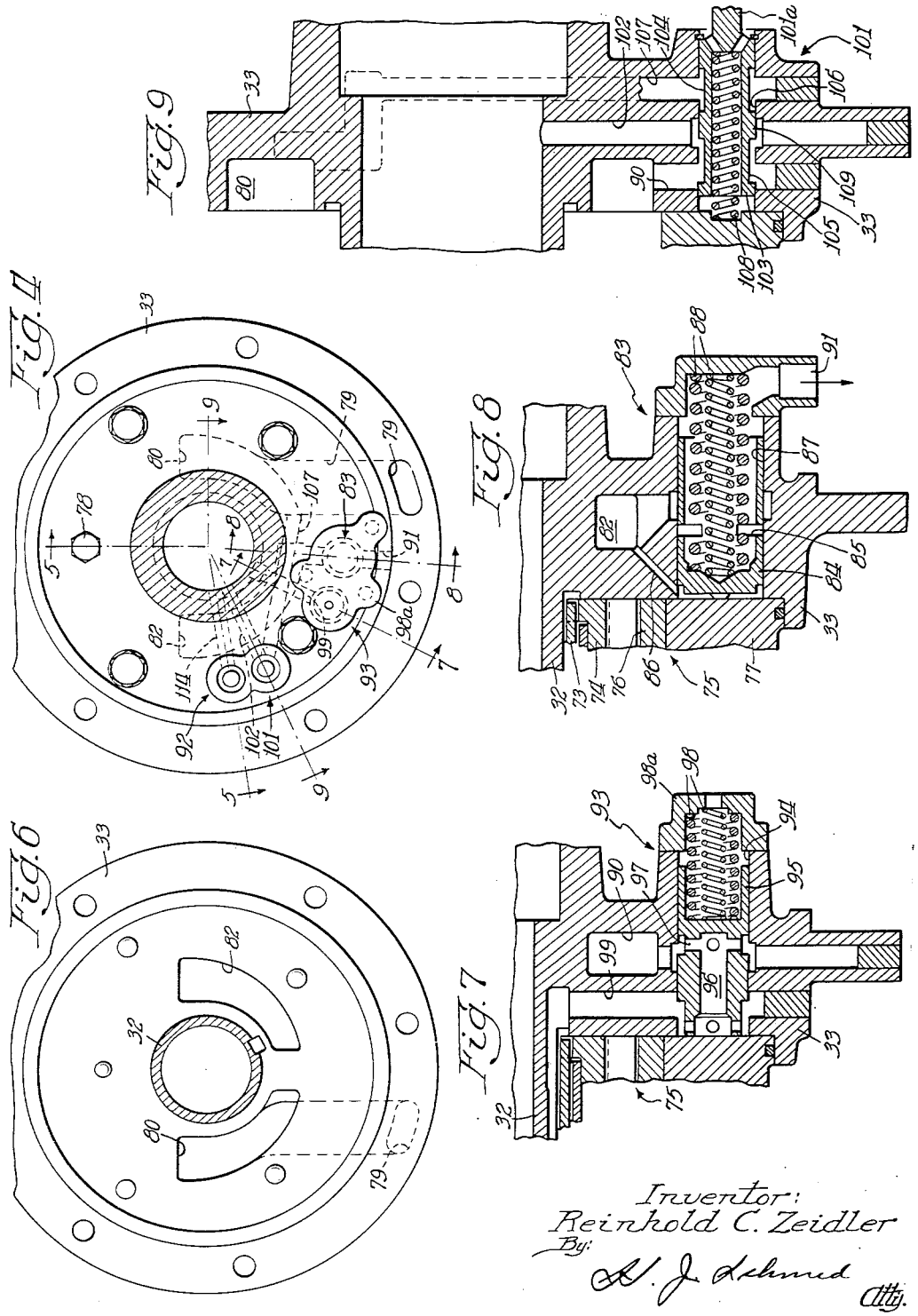

Inventor:
Reinhold C. Zeidler
By:
H. J. Schmid
Atty.

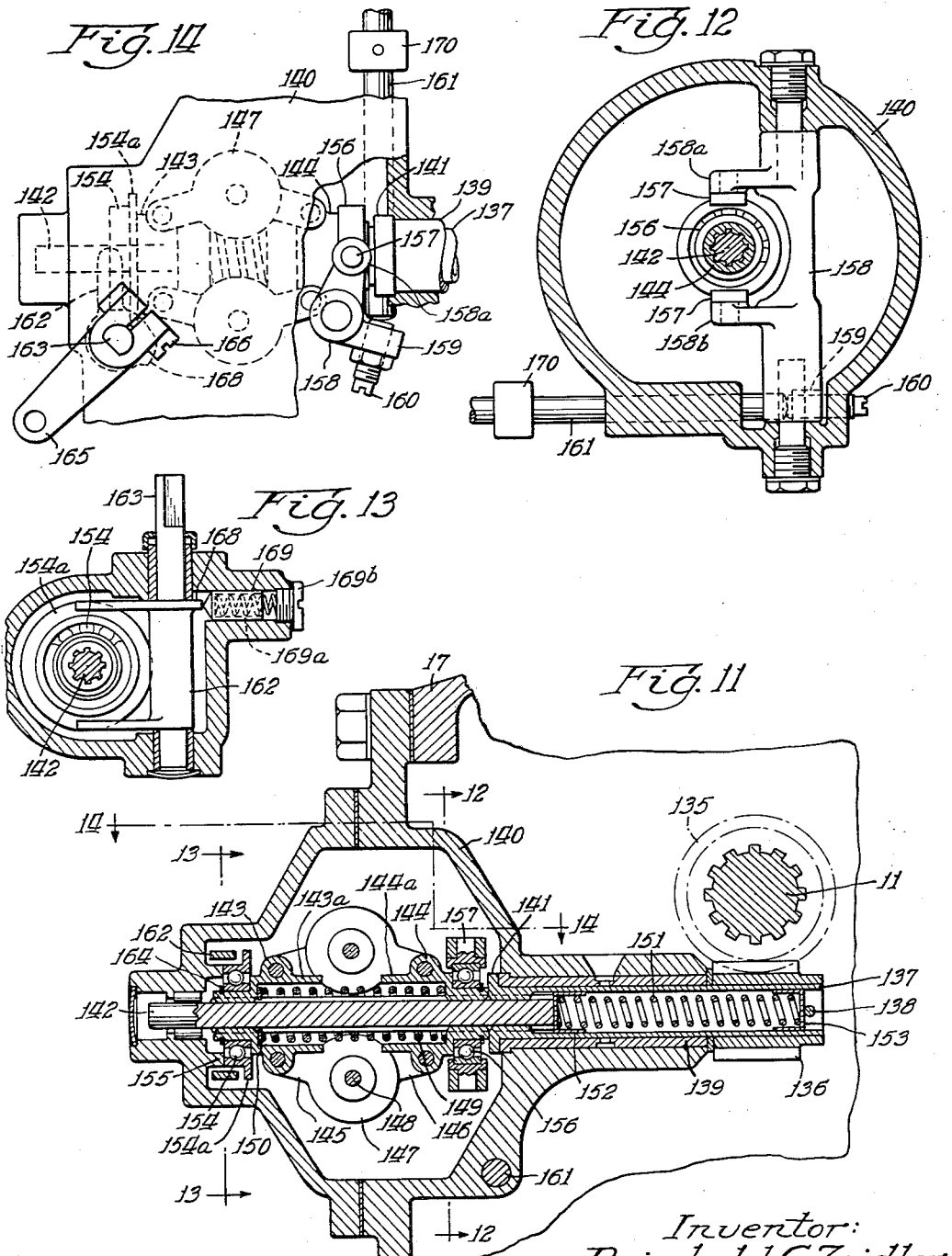

Inventor:
Reinhold C. Zeidler
By:
H. J. Schmid
Atty

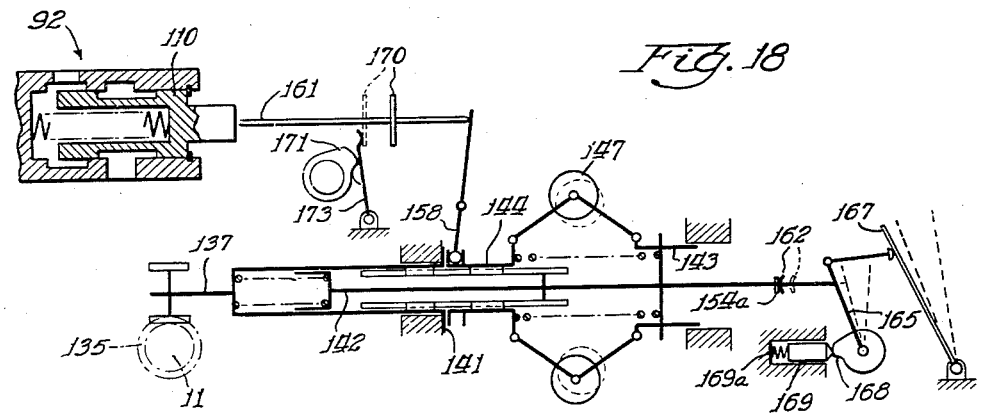
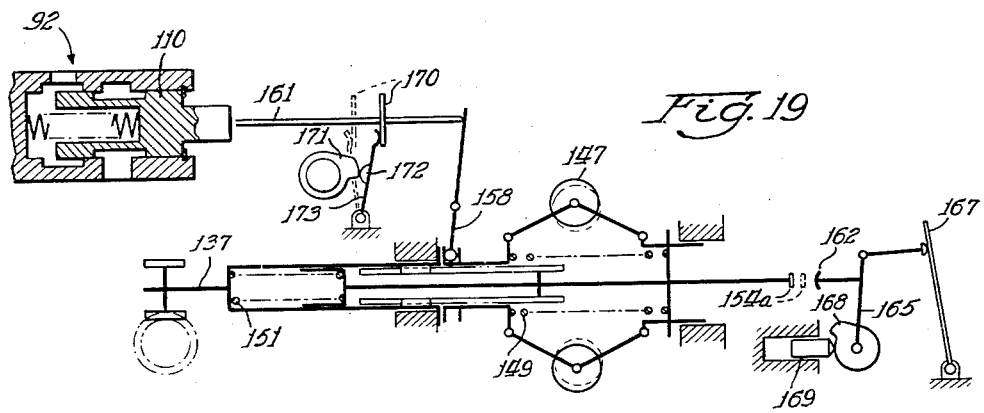

United States Patent Office 2,950,630
Patented Aug. 30, 1960

2,950,630

TRANSMISSION

Reinhold C. Zeidler, Detroit, Mich., assignor to Borg-Warner Corporation, Chicago, Ill., a corporation of Illinois Filed Mar. 16, 1955, Ser. No. 494,652

20 Claims. (Cl. 74—645)

This invention relates to power transmissions and controls therefor, and more specifically to change speed transmissions and controls which are particularly useful in automotive vehicles.

An object of the invention is to provide an improved power transmission and controls therefor.

It is an object of the invention to provide improved means for push-starting the engine in the neutral condition of the transmission and which is in the form of a one-way clutch operative to provide a drive when the engine is inoperative and the driven shaft is driven by the vehicle, while being normally inoperative during forward drive of the vehicle by the engine.

Another object of the invention is to provide an improved transmission for an engine-driven vehicle and having mechanism for push starting the engine in the neutral condition of the transmission when the vehicle is moved forwardly, and which mechanism is automatically disabled upon starting of the engine.

Another object of the invention is to provide an improved power transmission including the provisions of a change speed transmission drivingly disposed between driving and driven transmission shafts for providing low and high speed power trains, the low speed power train including a friction clutch and also an overrunning clutch of which a driven part is adapted to overrun a drive part during establishment of the high speed power train, and the high speed power train includes a friction clutch to directly connect the drive and driven shafts; and a one-way clutch connecting the shafts when the change speed transmission is in neutral and the driven shaft is driven faster than the drive shaft under coast load or push starting conditions.

Another object of the invention is to provide an improved power transmission including the provision of a hydrodynamic coupling device, and change speed gearing providing a low speed power train, the hydrodynamic coupling device including an impeller connected to the engine drive shaft and a turbine connected to an intermediate shaft coupled to the change speed transmission driving the transmission driven shaft; a clutch directly connecting the drive and driven shafts to provide a high speed power train, and a one-way clutch engageable to connect the intermediate shaft and driven shaft during operation of the high speed power train to couple the impeller and turbine of the hydrodynamic coupling device for unitary rotation, said one-way clutch being disengaged during operation of the low speed power train to permit the impeller and turbine to rotate at different speeds.

A further object of the invention is to provide automatically operative speed ratio change controls coupled with auxiliary manual controls capable of nullifying or overruling the automatic controls to meet different road conditions requiring immediate demand of selection of a certain speed ratio by the driver for safety in emergencies.

A further object of the invention is to provide, in a power transmission as described, an improved control system for the friction clutches thereof including hydraulic controls for the clutches, one of the clutches being responsive to manual or electromagnetic means at the will of the driver, and the other of the clutches being responsive to automatically operative speed-responsive means controllable by auxiliary manual controls at the will of the driver.

A further object of the invention is to provide an improved hydraulic control system for the speed change devices of the transmission and utilizing a single pump, a minimum number of valves positioned in the pump housing, and the location of all manifolds for hydraulic pressure fluid distribution in the pump housing, to provide a simple and compact unit.

A further object of the invention is to provide an improved control arrangement for a clutch of the transmission.

A still further object of the invention is to provide an improved control arrangement for a clutch of the transmission including a fluid pressure motor for operating the clutch, a valve controlling the supply of pressure fluid to the motor, and driver-operable means to control the valve, which may be optionally rendered effective by electrically-operated force or by mechanically-directed force.

Another object of this invention is to provide an improved transmission and controls therefor which is simple in construction, economically manufactured, compact in assembly, and durable and efficient in use.

The invention consists of the novel constructions, arrangements, and devices to be hereinafter described and claimed for carrying out the above-stated objects, and such other objects as will appear from the following description of a certain preferred embodiment of the invention illustrated in the accompanying drawings, wherein:

Fig. 2 is a diagrammatic view of the transmission shown in Fig. 1;

Fig. 3 is a sectional view of a one-way clutch illustrated in Figs. 1 and 2, said section taken on line 3—3 of Fig. 1 and looking in the direction of the arrows;

Fig. 4 is a side elevational view of the housing for the hydraulic pump and the valve arrangement system, said view being taken on line 4—4 of Fig. 1 looking in the direction of the arrows;

Fig. 5 is a sectional view of the pump and valve housing taken on line 5—5 of Fig. 4, and showing details of the control valve for the front clutch shown in Fig. 1;

Fig. 6 is a face view of the pump and valve housing as viewed from the left of the housing shown in Fig. 1, as indicated by line 6—6 of Fig. 1;

Fig. 7 is a sectional view a fragmentary portion of the pump housing, and showing details of the control valve for the hydraulic torque converter of Fig. 1, said section being taken on the lines 7—7 of Fig. 4;

Fig. 8 is a fragmentary view of the pump and valve housing illustrated in Fig. 4, taken on lines 8—8 and showing details of the pump pressure relief valve;

Fig. 9 is a further fragmentary view of the pump and valve housing illustrated in Fig. 4, and showing details of the control valve for the rear clutch shown in Fig. 1, said section being taken on the lines 9—9 of Fig. 4;

Figure 10:
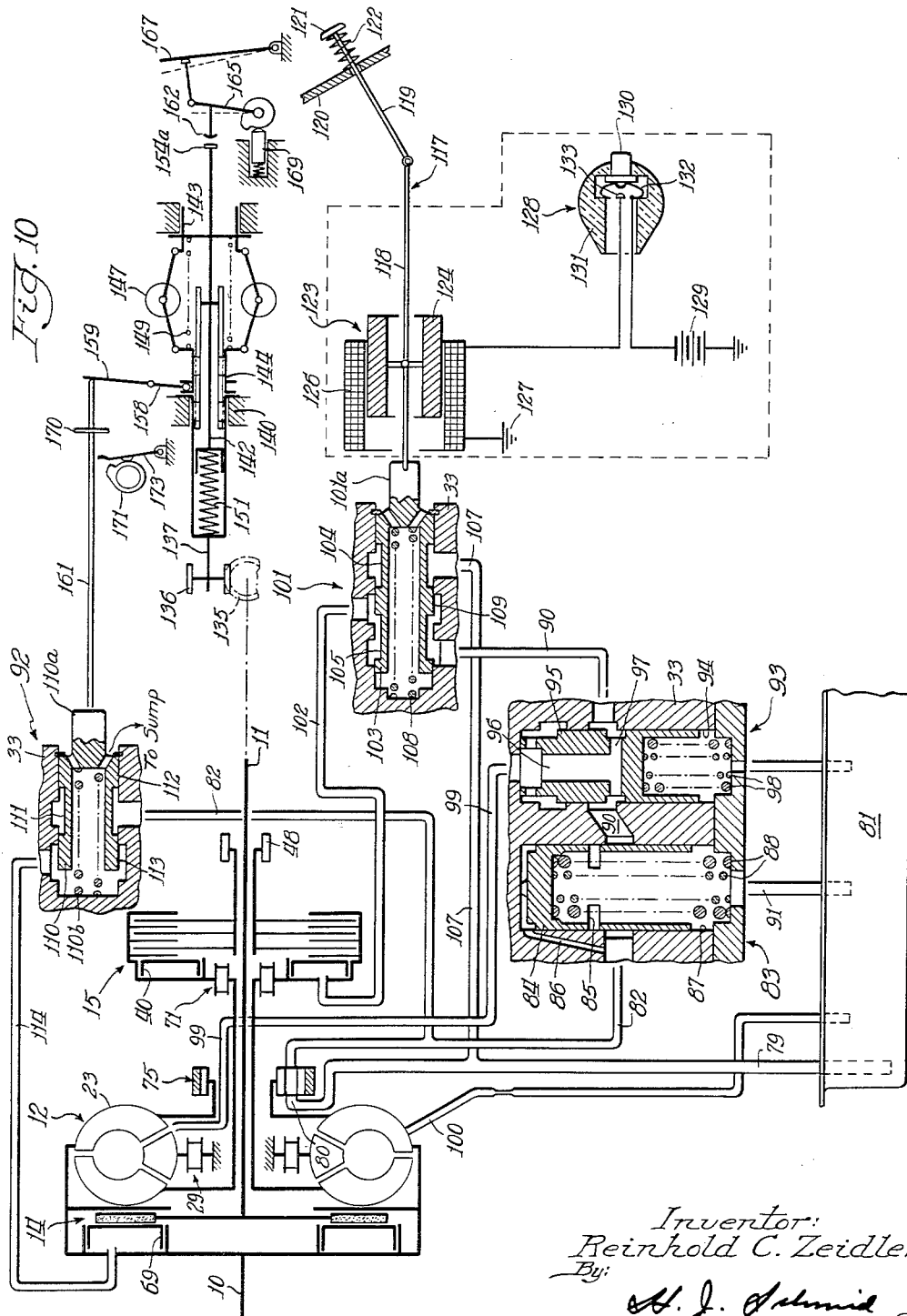
Fig. 10 is a schematic illustration showing diagrammatically the transmission and control mechanism therefor.

Figs. 11 to 14, inclusive, are views illustrating the speed-responsive governor and accelerator control mechanism shown schematically in Fig. 10.

Figs. 15 to 19, inclusive, are further schematic illustrations showing the governor and accelerator control mechanism in different positions for obtaining various drive conditions of the transmission.

Like characters of reference designate like parts in the several views.

Figure 1:
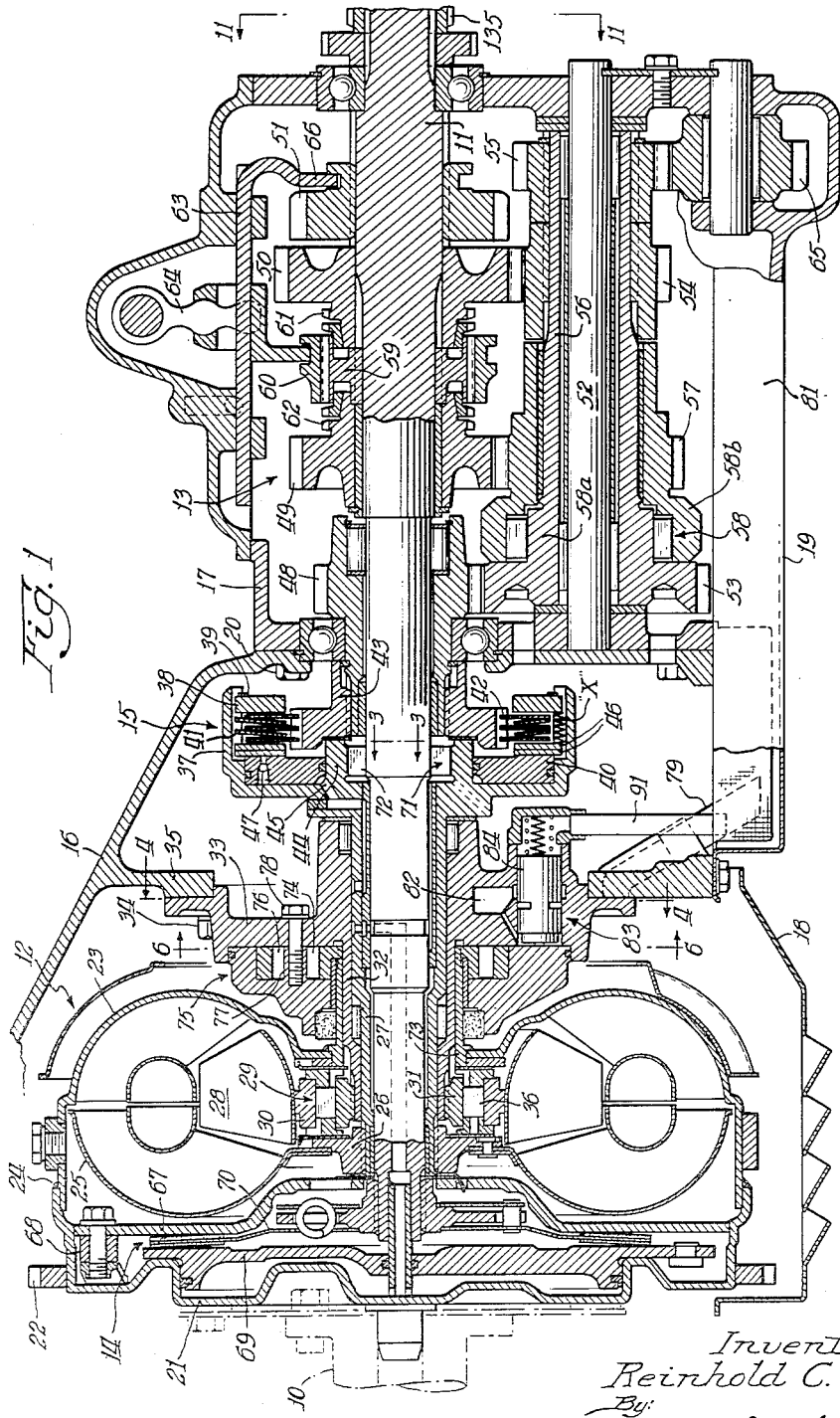
Fig. 1 is a longitudinal sectional view of a transmission embodying principles of my invention.

Referring now to Figs. 1 and 2 of the drawings, the power transmission illustrated comprises a drive shaft 10 and a driven shaft 11. The drive shaft 10 is adapted to be driven by the internal combustion engine of a vehicle in which the transmission is installed, and the driven shaft 11 is adapted to drive the rear road wheels of the vehicle through any suitable drive connection. The transmission comprises in general a hydraulic torque converter 12, a countershaft type speed change gear set 13, a high speed friction clutch 14, and intermediate speed friction clutch 15.

Referring first, more particularly to Fig. 1, the casing containing the transmission is composed of two sections 16 and 17 having their lower extremities closed by a shield 18 and pan 19, as shown. The casing section 16 is attached to the rear of the crankcase of an automotive engine or like prime mover, and is secured to the section 17 by bolts 20 as illustrated. The drive shaft 10 is connected to a drive member or plate 21, carrying a ring gear 22 adapted to be engaged by an engaging and disengaging starting pinion which is not shown, inasmuch as the starter construction forms no part of the invention.

The hydraulic torque converter 12 comprises a bladed impeller having its shell 23 provided at its outer periphery with a cylindrical rim which is fitted in telescoping relation to a flange on the drive plate 21, and secured thereto by welding, as indicated at 24. The torque converter further comprises a bladed runner or driven element 25, having a hub 26 splined to a quill or intermediate shaft 27; and a bladed stator or reaction member 28 connected with a one-way brake 29 disposed between a hub 30 which forms the outer race of the one-way brake, and an inner collar or race 31 splined to a stationary sleeve 32 forming an integral axially-extending and projecting portion of a wall 33 of the casing 16 bolted as at 34 to an inwardly-directed flange 35 of the casing 16.

The wall 33 also forms a portion of the hydraulic control arrangement for the hydraulic torque converter of the transmission and also the clutches 14 and 15, which will be described hereinafter. The one-way brake 29 is effective to hold the stator 28 against rotation in a reverse direction, that is, in the direction of rotation opposite that of the drive shaft 10. The brake 29 may be of any suitable construction, and may, for example, comprise tiltable sprags 36 disposed between and engageable with the outer and inner cylindrical races 30 and 31.

The drive plate 21 and impeller shell 23 provide a fluid-tight container for the torque converter elements. With fluid in the container and with rotation of the impeller, the torque converter operates to rotate the turbine at a speed which is dependent upon the speed of the impeller and the load on the turbine. When the load on the turbine is great, as when an automotive vehicle in which the transmission is installed is being started from rest, the turbine is rotated at a torque greater than impressed on the impeller but at a speed considerably less than that of the impeller, and the stator is held stationary by the one-way brake 29, and when the speed of the turbine increases, the stator will eventually rotate due to the release of the one-way brake, and the torque converter operates as a simple fluid coupling. The fluid medium in the torque converter is maintained under pressure by a pump and valve arrangement to be described.

The friction clutch 15 comprises a drive member in the form of a cylindrical housing or drum 37, having its radially inner extremity forming a hub integral with the quill shaft 27, and rotatable thereby. Positioned within the clutch housing 37 is a backing plate 38 held against axial movement by a lock ring 39 received within a groove in the inner cylindrical surface of the housing 37. Positioned within the clutch housing 37 is also an annular pressure plate 40, and between the pressure plate 40 and the backing plate 38 are disposed a plurality of annular friction plates 41 and 42 in intercalated relationship, the plates 41 being splined to the housing 37 for rotation thereby and for axial movement, and the plates 42 being splined to a hub or ring 43 for rotation thereby and for axial movement, so that, upon movement of the pressure plate 40, the plates 41 and 42 will engage to provide a drive from the quill shaft 27 and housing 37 to the ring 43. The pressure plate 40 is adapted to be moved to engage the clutch 15 and can be said to also form a pressure fluid actuated motor or piston having seals in the inner and outer diameter thereof engageable respectively with the inner cylindrical surface of the housing 37 and the cylindrical surface of an axially-extending flange 44 of the housing 37 defining a fluid pressure chamber and slidably mounting the piston 40, and into which chamber fluid under pressure may be admitted by a port 45 to the clutch housing 37. Disposed between the piston and the friction plates 41 and 42 are two flat spacer plates 46 having drive teeth at their outer circumference similar to plates 41. While two thin plates are shown, one thick plate would serve the purpose. However, the thinner plate can be more easily produced using a blanking die and two thin ones may be less costly than a thick one requiring a hobbing operation to produce the teeth. Plates 41 are formed conical similar to a Belleville spring and, upon release of the clutch, assist in separating the driving from the driven plates 42. A plurality of coiled compression springs "X" spaced within the hollows of the driving teeth of housing 37 and in line with teeth omitted from plates 41 react against member 38 and plates 46 to cause piston 40 to retract upon reduction of the fluid pressure. Extending through the piston 40 is a passage in which is received a ball valve, generally indicated at 47, effective to close the passage from the pressure fluid chamber to the friction clutch plates upon introduction of fluid pressure into the chamber and being movable in the passage to open the passage upon the release of fluid pressure in the chamber and actuation of the piston by the coiled springs "X."

The gear set 13 comprises a plurality of gears 48, 49, 50, and 51 supported on the driven shaft 11, and also a countershaft 52 supporting a gear cluster having gears 53, 54 and 55 rotatably mounted thereon by roller bearings, as shown. As will be seen from an inspection of Fig. 1, the gear 53 has a sleeve 56 integral therewith rotatable on the shaft 52, the sleeve having the gears 54 and 55 splined thereto, the sleeve further supporting a gear 57 for relative or conjoint rotation, as determined by the operation of a one-way clutch 58 of conventional sprag or roller-type form, and having its inner race 58a provided by a portion of the sleeve 56 with an extension of the hub of the gear 57 providing the outer race 58b of the one-way clutch. The gear 48 is secured to the hub 43 of the clutch 15 by a splined connection and rotates therewith and meshes with the gear 53. The gears 49 and 50 are rotatably supported on the shaft 11 and are in constant meshing engagement with the gears 57 and 54 respectively. The gear 51 is splined to the shaft 11 and is axially movable on the shaft. Disposed between the gears 49 and 50 is a synchronized clutch including a hub 59 splined to the shaft 11, and carrying therewith a manually-shiftable sleeve 60 splined to the hub 59 and adapted to be shifted from its neutral position, as shown in Fig. 1, either rearwardly to clutch the teeth 61 on the gear 50, or else forwardly to clutch with teeth 62 of the gear 49. Sleeve 60 is operably connected to a shift fork and rail 63 movable by a lever 64 for operation by any suitable means under the shifting control of the vehicle driver. The gear 51 is movable to mesh with a reverse idler gear 65 which is meshed with the gear 55 for providing reverse drive upon movement of the gear 51 to the right by the shift rail 66 operably connected to the lever 64 for providing a reverse drive.

The friction clutch 14 comprises a backing plate 67 fixed to a bracket 68 welded to the drive plate 21; a pressure plate 69 movable into engagement with the clutch driven plate 70, having its hub splined to the forward end of the driven shaft 11 upon engagement of the clutch driven plate 70 with the backing plate 67 and pressure plate 69 to provide a direct drive connection between the drive shaft 10 and the propeller shaft or driven shaft 11. The clutch 14 is adapted to be hydraulically operated and, for this purpose, the drive plate 21 is formed to provide an inner cylindrical surface for slidably supporting the pressure plate 69, which has a driving connection with plate 21. The drive plate 21 and the pressure plate 69 define a chamber for fluid under pressure to force the pressure plate 69 into engagement with the driven plate 70. The drive plate 21 forms a cylinder to receive the pressure plate 69. The pressure plate 69 thus forms a pressure fluid operable motor or piston, which may be actuated by the introduction of fluid under pressure into an axially-located and extending bore in the driven shaft 11 communicating with the pressure fluid chamber defined by the drive plate 21 and the pressure plate 69. The arrangement of the cylinder and piston of the hydraulically-operated friction clutch 14 is more particularly described in U.S. Patent No. 2,694,478 issued November 16, 1954.

A one-way clutch 71 of the conventional sprag type includes sprags 72 positioned between the driven shaft 11 and the flange 44 of the clutch housing 37, the flange 44 providing the outer race of the one-way clutch and the cylindrical surface of the shaft 11 providing the inner race of the one-way clutch. As shown in Fig. 3, the sprags 72 of the one-way clutch 71 are designed and positioned between the clutch housing 37 and the driven shaft to be in released or disengaged position during drive from the housing 37 to the driven shaft 11, but will be engaged, when the driven shaft 11 is rotated by the rear wheels of the vehicle faster than the housing 37 is rotated by the engine, to provide a connection between the driven shaft 11 and the housing 37 to drive the housing and turbine from the driven shaft 11. The function of the one-way clutch 71 will hereinafter be described in greater detail in a description of the operation of the transmission.

*Speed ratio conditions of the transmission*

In the neutral condition of the transmission, shown in Figs. 1 and 2, and assuming that the engine is operating, the drive shaft 10 will be effective to rotate the drive plate 21 and also the impeller 23 of the hydraulic torque converter 12, which, in turn, causes the fluid medium in the torque converter to circulate to rotate the turbine 25 and the quill shaft 27, and thereby the clutch shell 37. As the clutch 15 is not engaged at this time, drive cannot be transmitted to the gear set 13 and to the driven shaft 11. The clutch 14 is disengaged so that the drive shaft 10 and drive plate 21 cannot impart rotation to the driven plate 70 of the clutch 14 and to the driven shaft 11.

To obtain the first or low speed ratio power train of the transmission, the synchronizing clutch sleeve 60 is moved to the right into mesh with the teeth 61 on the gear 50 to couple the driven shaft 11 and gear 50, and the clutch 15 is then engaged. When the clutch 15 is engaged, drive will be transmitted from the drive shaft 10 to the drive plate 21 and the impeller 23, and the turbine 25 of the torque converter is driven, through the medium of the fluid in the torque converter. Rotation of the turbine 25 rotates shaft 27 connected to the engaged clutch 15, the gear 48 and the gear 53, which gear 53 drives the gear 54. Rotation of the gear 54 drives the gear 50, which, through its connection to the driven shaft 11 by the parts 60 and 59 of the synchronizing clutch, will impart rotation to the driven shaft 11 to provide first or low speed ratio.

To provide the second or intermediate speed ratio power train of the transmission, the clutch 15 is disengaged and the sleeve 60 of the synchronizing clutch is moved to the left to disengage the teeth 61 of gear 50 and to engage the teeth 62 of the gear 49. The clutch 15 is then engaged. Drive is transmitted from the drive shaft 10 and drive plate 21, to the impeller 23, and thence to the turbine 25 of the torque converter, and through the engaged clutch 15 to the gear 48 meshing with the gear 53. The one-way clutch 58 is effective to transfer the drive from the gear 53 to the gear 57, and thence to the gear 49. As the gear 49 is connected to the driven shaft 11 by the synchronizing clutch, the driven shaft 11 will be rotated to provide second or intermediate speed ratio.

A third speed ratio or direct drive power train is provided upon engagement of the friction clutch 14, while the clutch 15 and synchronizing clutch are engaged during establishment of second speed ratio. Engagement of the clutch 14 directly couples the drive shaft 10 and propeller shaft 11 to provide the third and highest speed ratio of the transmission. As the driven shaft 11 is driven faster than the gears 49 and 57, the one-way clutch 58 will automatically disengage and release the drive normally transmitted by the gear 53 to the gears 57 and 49 for second speed drive. The one-way clutch 58 will become immediately and automatically engaged, upon release of the clutch 14, to establish second speed drive of the transmission.

To obtain reverse drive, the clutch 15 is disengaged and the gear 51 is shifted into engagement with the gear 65 meshing with the gear 55, and the clutch 15 is then engaged, the clutch 14 being disengaged at this time. Drive is transmitted from the drive shaft 10 to the drive plate 21, and thence through the torque converter 12 to the clutch 15, and from the clutch 15 to the gear 48 and gear 53, to rotate the gear 55, gear 65, and gear 51 to drive the driven shaft 11 in a reverse direction to the direction of rotation of the shaft 11 during first, second and third speed ratio drives.

During the establishment of the high speed or third speed ratio of the transmission in which the clutch 14 serves to couple the drive shaft 10 and the driven shaft 11 together to transmit drive directly from the shaft 10 to the shaft 11, and should the driver than raise his foot from the accelerator, or in the event downhill conditions are met, the engine will serve to brake the vehicle, due to the vehicle rear wheels rotating the shaft 11 and the shaft 10 coupled to the engine.

In the low or first speed condition of the transmission, the engine is available for braking purposes when the accelerator is released by the driver, and the driven shaft 11 will then become the drive shaft, and the gear set 13, in the low speed condition, will transmit drive to the clutch 15 and thence to the hydraulic torque converter 12 to the shaft 10 and the engine to provide very ample braking for the steepest grade that may be encountered.

An important feature of the transmission is the operation of the one-way clutch 71, which is normally disengaged and thereby ineffective to transmit drive from the drive shaft 10 to the hydraulic torque converter and intermediate shaft 27 and to the gear set 13 and driven shaft 11 in the first and second speed ratios when the engine is driving the drive shaft 10, and which clutch 71 is rendered effective, by its engagement, to couple the intermediate shaft and driven shaft when the shaft 11 is driven by the rear wheels of the vehicle, the transmission is in its neutral condition, and the engine is inoperative, in an emergency requiring push-starting the engine.

Referring to Figs. 1, 2 and 3, the one-way clutch 71 functions in the following manner. Assuming that the rotation of the turbine 25 is counterclockwise, as viewed from the rear of the transmission and, as indicated by the arrow in Fig. 3, the shaft 27 and the clutch housing 37 having the flange 44 providing the outer race of the one-way clutch 71, will also rotate in a counterclockwise direction. During this counterclock rotation of the driven shaft 27, during its driving in the first speed ratio, the clutch 71 will be disengaged and freewheel, and this is equally true when the turbine shaft rotates while driving in second speed ratio and also in reverse. However, when push-starting in the neutral condition of the transmission, the one-way clutch 71 is locked to couple the shaft 27 and 11 together.

Assuming the driven shaft 11 rotation is in a counterclockwise direction, as viewed from the rear of the transmission, when coasting in direct, push-starting in the neutral condition of the transmission, and also coasting in second speed ratio, the one-way clutch 71 is in a locked engaging condition; and when the main shaft rotation is in a counterclockwise direction during drive in the first and second speed ratios, coasting in first speed ratio, as well as braking in first speed ratio, the one-way clutch freewheels.

Again referring to Fig. 3, the driven shaft 11 rotates in a clockwise direction when driving in reverse, and, at this time, the freewheeling clutch 71 is in its freewheeling condition.

Concerning the operations necessary to push-start the engine, and assuming the transmission is in the neutral condition with the clutch 14 and clutch 15 disengaged and the gear set inoperative to transmit drive, the vehicle is pushed and will start to move, and the propeller shaft and driven shaft 11 will immediately start rotating, and through the one-way clutch 71 it will rotate the shaft 27 connected to the turbine 25 of the hydraulic torque converter. Because there is only a fluid connection between the turbine and the impeller of the hydraulic torque converter, it may take a car speed of around 15 to 25 m.p.h., depending upon the weather conditions, to cause enough circulation of oil in the converter to turn over the engine. With the transmission in the neutral condition described, if the engine becomes operative and should start to race, the car will not be accelerated because there is no clutch or gear connection in the transmission to provide a drive through the transmission, the engine drive being from the drive shaft 10 to the hydraulic torque converter to the disengaged clutch 15, and it will be noted that, upon the drive being transmitted from the shaft 10 to the clutch housing 37 and its flange 44, the one-way clutch 71 will become disengaged to prevent any possibility of the engine transmitting drive to the propeller shaft 11. Should the clutch 15 be engaged, the gear set cannot provide a drive from the clutch 15 to the propeller shaft 11, inasmuch as the gear set is in the neutral condition, as shown in Figs. 1 and 2. This feature is of considerable advantage in transmissions as the transmission is in its neutral condition during push-starting, and should the engine become operative, the driver can exercise complete control over the vehicle. In present commercially available automotive transmissions, it is necessary to establish a low or second speed ratio to push-start the engine, and this practice may endanger the driver and the vehicle, particularly in traffic conditions where the sudden surge of power to the vehicle by the engine becoming operative and transmitting drive through the transmission to the vehicle rear wheels, particularly if the transmission is in low speed or second speed condition, could result in dangerous collisions. According to the present invention, this ability to push-start the engine while the transmission is in a neutral condition is of considerable importance.

It will be apparent that, during the establishment of the second speed ratio power train, drive is transmitted through the gear set 13 through the instrumentality of the one-way clutch 58, the drive being from the drive shaft 10 to the hydraulic torque converter 12 to the engaged clutch 15, and thence through the gear set 13, including the one-way clutch 58 to the driven shaft 11. During operation of the transmission in this second speed ratio, should the driver release his foot from the accelerator or under downhill conditions, so that the rear wheels of the vehicle tend to drive the driven shaft 11, the one-way clutch 58 will release and freewheel to establish a coast condition of the vehicle. However, as the speed of the vehicle and thereby the driven shaft 11 decreases, it will be seen that the engine will decelerate but still drive the impeller and turbine at a speed less than the speed of the driven shaft until the turbine drops down to the speed of the driven shaft when the one-way clutch 71 will engage and the engine deceleration is arrested by the one-way clutch transmitting drive from the driven shaft to the drive shaft and engine. This feature is desirable since it reduces the nudge to the vehicle when the accelerator is again depressed and the engine speed rises to vehicle speed. Also, should the high speed ratio be effective and a coast condition of the vehicle occurs, the engaged high speed clutch 14 will provide braking of the vehicle by the engine and, assuming the high speed clutch 14 is released, the shaft 11 will drive the intermediate shaft 27 and turbine due to the engagement of the one-way clutch 71, under the above-described second speed ratio condition of the transmission when the engine decelerates until the turbine speed drops down to the speed of the driven shaft.

It will be noted that, in direct drive, the friction clutch 14 connects the drive shaft 10 and driven shaft 11, and, as the turbine 25 and clutch shell 37 rotate at a slower speed than the driven shaft 11, the one-way clutch 71 is engaged and effective to connect the turbine and clutch shell to the driven shaft 11 to rotate the turbine at the same speed as the drive shaft 10 and impeller 23 to thus lock up these hydraulic torque converter elements for unitary rotation.

*Hydraulic controls of the transmission*

Referring to Fig. 1, the impeller 23 of the hydraulic torque converter has its shell provided at its radially inner extremity with a hub 73 in the form of a cylindrical sleeve having at one end thereof a gear 74 for driving a pump 75 of well-known form and commonly known as an internal gear pump, and comprising the inner gear 74, driven by the impeller 23 of the torque converter 12 from the drive shaft 10, and an outer gear 76 eccentrically located with respect to the inner gear 74 and in mesh with the latter gear. A crescent-shaped portion of a casing 77 separates the gears 74 and 76. The gears 74 and 76 and the crescent-shaped portion are within a pump housing formed by the plate 33 and casing 77, the plate 33 being secured to the transmission casing 16 by the bolts 34, and the casing 77 being secured to the plate 33 by bolts 78, as shown.

Referring to Figs. 1, 4, 6 and 10, the pump 75 is connected to an inlet conduit 79 secured to the housing plate 33 and communicating with a fluid inlet passage 80 in the plate 33. The pump is also connected to an outlet passage 82 formed in the pump housing plate 33. The pump is of a well-known construction and operates, as is well understood, to pump fluid from the conduit 79 and passage 80 to the passage 82 upon rotation of the inner gear 74 and the outer gear 76, the pumping action being due to the fluid carried by the gears across the inner and outer faces of the crescent-shaped casing portion.

The outlet passage 82 of the pump is connected to a maximum or high pressure relief control valve 83 as shown in Figs. 1, 8, and 10. The valve 83 comprises a piston 84 slidably disposed in the pump housing plate 33. The piston 84 is cup-shaped having spaced ports 85 located intermediate the ends thereof. The plate 33 is provided with the pump outlet port 82, and a passage 86 connected thereto, and to the cylindrical chamber 87 receiving the piston 84. A plurality of telescoping compression springs 88 are disposed within the hollow piston between the head of the piston and one end of the chamber 87 in the plate 33. The capacity of the springs of the maximum or high pressure relief valve 84 may be set, for example, at 90 p.s.i. maximum.

Referring to the schematic hydraulic control arrangement of Fig. 10, the valve 83 controls the maximum pressure of the fluid from the pump flowing to the front clutch control valve 92, the rear cluth control valve 101, and the hydraulic torque converter fluid pressure control valve 93. More particularly, and referring to Fig. 10, fluid under pressure from the pump entering into the pump outlet passage 82 will normally flow to a passage 90 connected to the valve 93 controlloing the pressure of the fluid in the hydraulic torque converter. The passage 90 also communicates with the valve 101. The pump outlet passage 82 communicates with and will convey fluid to a control valve 92 for the front clutch 14, and, as the passage 82 is connected to the valve 83, this valve 83 will also control the maximum pressure of the fluid from the pump.

The position of the maximum or high pressure relief valve 83, as shown in Figs. 1, 8 and 10, is indicative of the position assumed when the pressure of the fluid from the pump is insufficient to operate the relief valve. In this position of the valve, as clearly shown in these figures, the piston 84 is moved to its extreme limit and is maintained in this position by the compession springs 88 to block the passage of fluid from the pump outlet 82 to the outlet 91 to the sump 81. Upon the fluid pressure in the pump outlet passage 82 rising above the maximum or high pressure limit, the fluid entering the passage 86 and chamber 87 will force the piston 84 to the right (Fig. 8) to align the passage 82 and ports 85 of the piston 84 to cause some of the fluid under pressure in the passage 82 to pass through the ports 85 in the piston and through the piston to the passage 91 communicating with the sump 81, the piston thus automatically controlling the pressure of the fluid to a desired maximum of 90 p.s.i. to the front and rear clutch valves and the torque converter pressure control valve.

The control valve 93 for regulating the pressure of the fluid in the hydraulic torque converter is shown in Figs. 7 and 10, and is positioned within a cavity 94 of the plate 33 forming a portion of the pump housing. More particularly, the valve 93 comprises a piston 95 slidably received within a cavity 94 in the plate 33. The piston 95 is provided with a centrally-located passage 96, and passages 97 communicating with the passage 96, and the passage 90 in the plate 33 communicating with the high pressure relief valve 83. Springs 98 are provided between a cap 98ª secured to the plate 33 and the piston 95, and the springs normally serve to move the piston to the left to the position shown in Fig. 7. The plate 33 is also provided with a passage 99 communicating with the cavity 94 and the passage 96 in the piston, as shown in Fig. 7. In the performance of its function in controlling the pressure of the fluid in the hydraulic torque converter, the valve 93 regulates the pressure of the fluid from the pump to the passage 99 in fluid communication with the interior of the hydraulic torque converter as shown in Fig. 10, the pressure of the fluid in the torque converter being maintained at a maximum pressure, for example, 50 p.s.i., by operation of the valve 93. The torque converter is provided with an outlet passage 100 communicating with the sump 81, as shown in Fig. 10, the piston passage 100 being provided with a restricted orifice for regulating the flow of the fluid from the hydraulic torque converter by causing back pressure in the converter. The size of the restriction is such as to cause a pressure at this point of about 25 p.s.i. resulting in a mean pressure in the converter of perhaps 42 p.s.i. sufficient to minimize cavitation. The difference in pressure of 50 p.s.i. in and 25 p.s.i. out is to cause sufficient flow through the converter for cooling purposes.

It will be noted from an inspection of Fig. 7 that the pressure fluid from the pump in the passage 90 is shown in constant communication with the passages 97 and 96 in the piston 94, and with the passage 99 communicating with the hydraulic torque converter. When the pressure of the fluid in the conduit 90 is under the maximum pressure desired in the hydraulic torque converter, the piston 95 will remain in the position shown in Fig. 7. However, upon the pressure of the fluid increasing above the maximum limit desired in the torque converter, for example 50 p.s.i., increasing pressure of the fluid in the passages 97 and 96 will cause the piston 94 to be moved to the right to restrict or close off the passage of the fluid from the passage 90 to the passage 97 and 96 in the piston 95 to provide a regulated pressure of the fluid in the passage 99 and in the hydraulic torque converter.

Fluid under pressure in the passage 90 also communicates with the control valve 101 for the rear clutch 15 shown in Figs. 9 and 10. As shown in Fig. 10, a conduit 102 from the valve 101 communicates with the fluid pressure chamber in which the pressure plate 40 of the clutch 15 is located to engage and release this clutch upon movement of the control valve 101. The valve 101 is diagrammatically illustrated in Fig. 10, and more particularly in Fig. 9, and comprises a hollow piston 103, having grooves 104 and 105, received within a cavity 106 in the plate 33, the plate 33 having passages 102, 90, and 107 therein, the passage 90 from the pump providing an inlet for pressure fluid to the valve, the passage 102 communicating with the clutch 15, and the passage 107 leading to the sump. The piston 103 contains a spring 108 normally operative to position the valve, as indicated in Fig. 9. The piston 103 is provided at its right end with an extension 101ª for moving the valve to the left against the opposition of the spring 108. The piston is held in the cavity 106 of the plate 33 by a snap ring received within a groove in the cylindrical wall of the plate cavity and engaging the piston at one end thereof. In the normal position of the valve shown in Figs. 9 and 10, fluid under pressure from the passage 90 enters the groove 105 in the piston 103, and is directed into the passage 102 to engage the clutch 15. Upon movement of the piston 103 to the left, the land 109, defining the adjacent edges of the grooves 104 and 105, will cut off the supply of fluid under pressure in the passage 90 from the passage 102, and the fluid in the passage 102 will drain through the groove 104 into the passage 107 to the sump to effect release of the clutch 15.

As shown in Fig. 10, fluid under pressure from the pump is directed into the passage 82 to the control valve 92 for the front clutch 14. The control valve is diagrammatically illustrated in Fig. 10, and more particularly in Fig. 5. Referring to Figs. 5 and 10, the valve 92 comprises a piston 110 having a groove 111 defined by lands 112 and 113. The piston 110 is disposed within a cavity in the pump housing plate 33, and is urged to the right by a spring 110ᵇ to normally prevent fluid under pressure from the pump in the passage 82 communicating with the passage 114 connected to the fluid chamber in the clutch 14 in which the pressure plate 69 is positioned. As seen in Fig. 5, the piston is held in the cavity of the shell by a snap ring received within a groove in the cylindrical wall of the cavity and engaging one end of the piston. The piston 110 is provided with an extension 110ª exterior of the pump housing plate 33, and adapted to be actuated to compress the spring 110ᵇ, and to direct fluid from the pump and passage 82 through the groove 111 to the passage 114 for energizing the high-speed clutch 14.

It will be apparent from an inspection of the control arrangement, as shown in Fig. 10, that fluid under pressure from the pump is normally directed to the rear clutch 15, the valve 101 having its piston 103 moved by the spring 108 to the open position shown in this figure. The front clutch control valve 92 is normally closed and serves to block the passage of fluid from the pump to the passage 114 for energizing the high speed clutch 14, due to the action of the spring 110$^b$ urging the piston 110 to the right to prevent the passage of fluid from the pump to the high speed clutch 14. Thus, the clutch 15 is normally engaged, and the clutch 14 is normally disengaged.

With the clutch 15 engaged, and the clutch 14 normally disengaged, drive will not be transmitted between the drive shaft 10 and the propeller shaft 11, as the gear set 13 is in a neutral condition, as shown in Fig. 1.

*Manual and automatic controls for the hydraulic system*

Assuming that the engine is operative and the transmission is shown in its neutral condition in Fig. 1, and referring to Fig. 10, it is necessary that the clutch 15 be disengaged to establish a first speed ratio or second speed ratio condition by moving the synchronizer collar 60 to the right to obtain low speed ratio, and to the left to obtain second speed ratio. To disengage the clutch 15, the piston 103 of the valve 101 must be moved to the left to divert fluid under pressure from the clutch 15 to the passage 102 and through the valve to the passage 107 leading to the sump.

The manual control arrangements for the valve 101 are illustrated in Fig. 10 for effecting movement of the valve to disengage the clutch 15. More particularly, the valve piston 103 may have its extension 101$^a$ connected by mechanical linkage schematically illustrated at 117 and comprising a push rod 118 connected to the extension 101$^a$ of the piston and pivotally connected to a rod 119 extending through the floorboard 120 in the driver's compartment of the automobile, rod 119 having the driver-operable foot pedal 121 connected thereto so that, upon movement of the foot pedal 121 toward the floorboard 120, the rods 119 and 118 will move the piston 103 to the left to block the fluid under pressure from the pump to the clutch and to release the pressure fluid in the passage 102 and clutch 15 to the sump. The spring 122 is disposed between the pedal 121 and the floorboard 120 for normally maintaining foot pedal 121 in its retracted position and to operate the pedal and the rods 119 and 118 to move the piston 103 to the position shown in Fig. 10 to open the valve 101.

A control arrangement may be optionally or jointly utilized by providing a solenoid-operated control of the rod 117. For this purpose, a solenoid 123 has its armature 124 surrounded by a winding 126 so that, upon energization of the coil 126, the armature 124 is moved to the left to move the piston 103 to a position releasing the clutch 15. The coil 126 is connected to a ground 127 and also to a switch 128 connected to the battery 129. The switch 128 may be located in the knob of the driver-operable shift lever for actuating the lever 64 shown in Fig. 1 to move the synchronizer collar 60 to either its low or second speed ratio positions. The switch 128 comprises a button 130 received within a cavity in the gear shift knob 131. The button 130 is normally held out to extend above the knob 131, as shown in Fig. 11, by spring 132, serving also as the contact for directing electric current from the battery 129 to the contact 133 and to the coil 126. Upon depression of the button 130 by the operator, the coil 126 is energized to move the armature 124 and piston 103 to the position releasing the clutch 15.

As previously described, and referring to Fig. 1, movement of the collar 60 to the right to engage the teeth 61 on the gear 50, and engagement of the clutch 15, will establish the first or low speed ratio drive of the transmission. Movement of the synchronizer collar 60 to the left will cause the teeth 62 of the gear 49 to be engaged and, upon engagement of the clutch 15, the second or intermediate speed ratio of the transmission will occur. The high or third speed ratio of the transmission may then be obtained, without releasing the clutch 15, by engagement of the clutch 14 to couple the crankshaft 10 and the propeller shaft 11, the overrunning clutch 58 of the gear train 13 automatically overrunning during operation of the transmission in its high speed ratio condition.

The present invention provides automatic speed responsive control means for effecting operation of the control valve 92 for engaging and disengaging the clutch 14, the speed responsive control means being connected to manual throttle operating means, such as the accelerator, to also make the speed responsive means torque controlled.

More particularly, and referring to Fig. 11, the driven shaft 11 is provided with a governor control mechanism responsive to the speed of the driven shaft and adjustable by the throttle opening of the carburetor by a driver-operable accelerator. As shown in Figs. 11 to 14, inclusive, the governor control mechanism comprises a spiral gear 135 splined to the driven shaft 11 and having its teeth meshing with the teeth of a spiral gear 136. The gear 136 is secured to a quill shaft 137 by a pin 138, the shaft 137 being disposed within a sleeve bearing 139 mounted in a cylindrical portion of the governor housing 140 bolted to the transmission casing section 17, as shown in Figs. 11 and 13. Axial movement of the quill shaft 137 is prevented by a flange 141 thereon engaging one end of the bearing 139 and, indirectly, by the pin 138 connecting the shaft 137 and gear 136 and positioning the gear 136 in abutment with a thrust washer engaging the other end of the bearing 139. Positioned within the quill shaft 137 is a solid shaft 142 provided with splines connecting one end of the shaft 142 with the shaft 137 to rotate the shaft 142 by the gear 136, and the opposite end of the shaft 142 is rotatably supported on a roller bearing assembly in the governor housing 140 as shown in Fig. 11.

A pair of identical collars 143, 144 are splined to the shaft 142 in axially spaced relation and connected by levers 145, 146 pivotally connected to each other and to the collars 143, 144, weights 147 being disposed between the adjacent ends of the levers and on pins 148 pivotally connecting the levers. The collars are formed with cup portions 143$a$, 144$a$, respectively receiving opposite ends of a coiled compression spring 149. As seen in Fig. 11, the one end of the spring 149 is seated on the collar 144 and the other end of the spring 149 abuts against a washer 150 received within a groove in the shaft 142 and engaging the collar 143. A coil spring 151 is positioned within the quill shaft 137 and its ends are confined by cups 152 and 153, the cup 152 engaging one end of the shaft 142 and the cup 153 engaging the stop pin 138. This arrangement of the spring 151 is effective to position the shaft 142 in the position shown in Fig. 11, the spring 151 (and also the spring 149) urging the shaft 142 and collar 143 to the left to engage the ball bearing assembly 154 with an annular flange 155 on the casing 140. Insofar as the present mechanism has been described, it will be apparent that the springs 149 and 151 normally maintain the weights 147 in their inward position, and outward movement of the weights 147, in response to centrifugal force, will cause the levers 145, 146 to first move only the collar 144 to the left to compress the spring 149, as the collar 143 is restrained from any movement due to the fact that both of the springs 149 and 151 must be compressed to effect movement of the collar 143. Movement of collar 144 is transmitted through a ball bearing assembly 156 to a shift collar 157 provided with trunnions received within openings in the spaced arms 158$a$, 158$b$ of a lever 158 pivotally connected to the governor housing 140, as shown in Fig. 12, the lever 158 having an arm 159 receiving a screw 160 abutting the end of a push rod 161 connected to the piston 110 of the control valve 92 for engaging and disengaging the high speed clutch 14. The screw 160 is desirable to provide an adjustment for the travel of the valve piston 110 by the speed responsive governor operation and as modified by the throttle valve manipulation of the accelerator, as will now be described.

To provide driver control of the action of the speed-responsive governor in the transition between second and high speeds, the governor mechanism may be controlled by the accelerator to vary the value at which the governor operates the piston 110 of the valve 92. For this purpose, the collar 143 carries the ball bearing assembly 154 having its outer race provided with a radially outwardly extending flange 154a spaced from the spaced arms of a lever 162 secured to a shaft 163 pivotally supported in the governor housing as shown in Fig. 13, the flange on the assembly 154 being engageable with the lever arms upon rotation of the lever. It will be noted that the assembly 154 has is inner race retained against the collar 143 by a washer 164 engaging the inner race and received within a groove in the collar 143.

Referring to Figs. 13 and 14, the upper end of the shaft 163 carries an arm 165, the arm 165 having an opening receiving the shaft and the arm and shaft having engaged flattened surfaces to compel conjoint rotation of the arm and shaft, one end of the arm being bifurcated and provided with a bolt and nut assembly 166 to tightly clamp the arm to the shaft. The arm 164 is connected to carburetor throttle linkage (not shown) under the control of a driver-operable accelerator 167 shown in Fig. 10. Manipulation of the accelerator 167 will rotate the shaft 163 to cause the arms of the lever 162 to move toward the flange 154a of the ball bearing assembly 154 until it engages the same, whereupon further movement of the accelerator moves the assembly 154, collar 143, and shaft 142 toward the right to compress the springs 149 and 151, the compression of the spring 149 increasing the spring load on the collars 143 and 144 to move the weights 147 inwardly against the centrifugal force actuating the weights 147 in an outward direction. The action of the speed-responsive governor can thus be modified or overruled by the driver operation of the accelerator to place the transition between second speed and high speed under the control of the driver.

Referring to Figs. 10, 13 and 14, the lever 162 is provided with a cam 168 engaging a detent 169 positioned in the governor housing 140 and movable therein by a spring 169a reacting against a member 169b in threaded engagement with the housing, and urging the detent 169 into engagement with the cam 168. The shape of the cam 168 is illustrated in Fig. 10. In this view, the detent is engaged with the cylindrical portion of the cam and as the accelerator 167 is depressed, the cam rotates in a counterclockwise direction to position the nose of the cam to rotate over the detent to move the detent against the pressure of the spring 170.

The operation of the transmission will best be understood by reference to Figs. 10–19 inclusive, Fig. 10 illustrating the position of the speed-responsive governor and control mechanism, and the accelerator-modifying mechanism in the neutral condition of the transmission when the engine is stopped or in idling position, as previously described with reference to the operation of the transmission mechanism of Fig. 1.

To obtain second speed, the clutch 15 is disengaged, and the shift collar 60 is moved to the left to engage the teeth 62 on the gear 49, and the clutch 15 is then engaged to condition the transmission for second speed drive.

Figure 15:
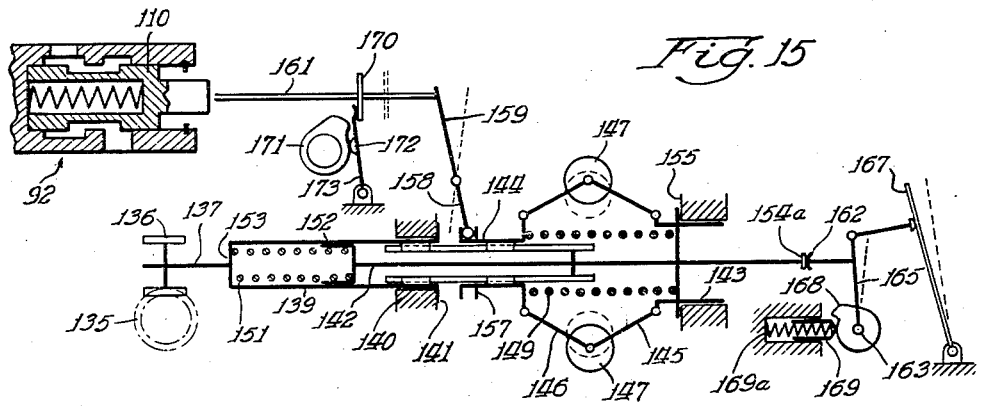

Referring now to Figs. 10, 15 to 19, inclusive, and assuming that the accelerator is depressed to the position shown in dotted lines in Fig. 10 to open the carburetor throttle valve slightly, and before the car actually starts to move, the lever 165 will be rotated to position the collar 162 in engagement with the flange 154a of the bearing assembly 154, but without moving the governor shaft 142. Assuming an increase in the car speed, the governor spring 149 is preloaded and will restrain outward movement of the weights 147 until a car speed of about 16 m.p.h. is reached, when the weights will move radially outward, pulling the governor collar 144 to the left to cause the lever 158 to rotate in a counterclockwise direction to position the piston 110 of the valve 92 to direct fluid to the front clutch 14 to engage the clutch to provide third speed or direct drive in the transmission. Fig. 15 illustrates the position of the governor and accelerator control, as well as the piston 110 of the valve 92, in solid lines, just after the upshift from second speed to third speed at about 16 m.p.h.

Figure 16:
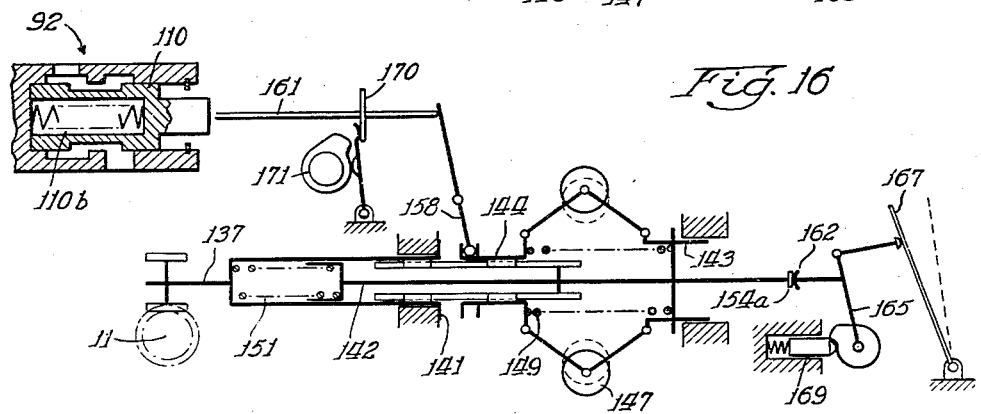

Fig. 16 illustrates, in dotted lines, a condition of the control system as the accelerator pedal is being moved to actuate the carburetor throttle valve toward its wide-open position when the car is starting from a standstill, and the solid lines indicate the condition of the control system when the accelerator has moved the carburetor throttle valve to its wide-open position, and just after the upshift from second speed to third speed at about 36 m.p.h. More particularly, the first accelerator action in starting the vehicle at wide-open throttle will move the lever 165 against the collar 154a of the sleeve bearing 154 to actuate the collar 143, and to simultaneously shift the shaft 142 and the governor assembly to the left against the light load of the spring 151. As the collar 144 is held against the quill shaft 137, the weights will be partially moved outwardly, and the governor spring 149 will be partially compressed. With a properly-calibrated governor spring, when the car reaches a speed of about 36 m.p.h., the weights will overcome the spring load and will move outwardly to cause operation of the valve 92 to engage the front clutch. It will be noted that the spring 110b in the front clutch valve 92 has a load of only a fraction of a pound, sufficient only to cause the valve piston 110 to return to its closed position when the control rod 161 is moved to the right in Fig. 10. The governor shaft spring 151 is slightly heavier than the valve spring 110b, so as the weights move out to open the valve in Fig. 16, the shaft 142 and the governor assembly will be positioned such that the collar 144 is held against the quill flange 141, except when the accelerator pedal is depressed to provide more than light throttle to cause the lever 158 to move to the left. Thus, only the governor spring 149 needs to be carefully calibrated to match the force of the governor weights 147 in proper relation to the change in car speed and accelerator depression.

Figure 17:
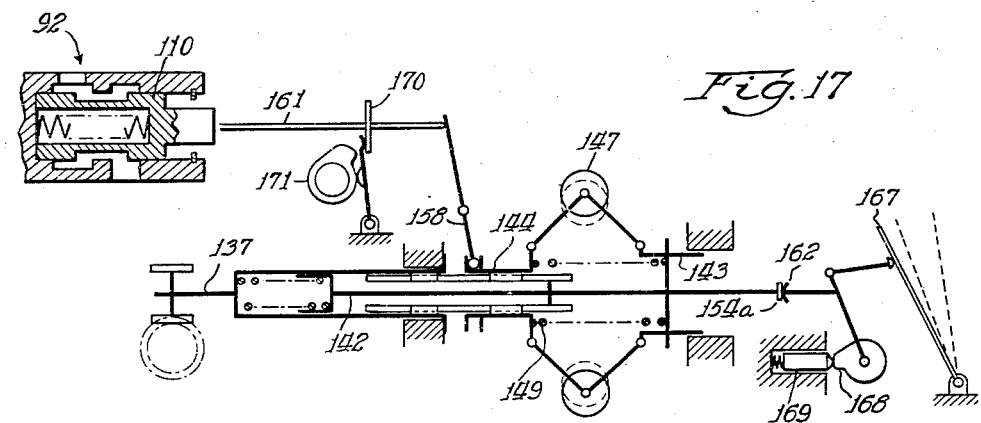

Referring to Fig. 17, a further condition of the governor and accelerator controls is shown, this mechanism being shown in dotted lines to illustrate that the accelerator has been depressed to move the carburetor throttle valve to its wide-open position, and beyond this to the "kick down" condition and it will be noted that the cam 168 has its highest point of its nose engaging the detent 169 with the car being in the position of just starting from a standstill; and the solid line position of the mechanism illustrates that the accelerator pedal has been depressed to cause the carburetor throttle valve to be moved beyond its wide-open position, with the nose of the cam riding upon the detent, and just after an upshift at about 64 m.p.h. More particularly, upon pressing the accelerator to a position where the cam nose is riding upon the detent, additional movement to the left is imparted to the governor shaft 142 and the centrifugal weight assembly, with the result that the collar 144 will be pressed more firmly against the quill shaft 141 to cause further compression of the governor spring 149. The resulting higher spring load of the spring 149 will necessitate a car speed of around 64 m.p.h. before the weights 147 will build up sufficient force to move outwardly, and cause the collar 144 to be moved to the right to rotate the lever 158 to move the piston 110 to direct fluid under pressure to the front clutch to effect engagement.

Fig. 18 illustrates a further condition of the governor and accelerator control mechanism, with the dotted line position of the mechanism being shown at speeds up to 50 m.p.h. in direct drive, and the solid lines of the mechanism illustrating the condition just after a kickdown or forced downshift into second speed from direct drive. Assuming that the transmission is in its high speed or direct drive condition, and that at 50 m.p.h. either on the level ground or in ascending a grade, more acceleration is required. At this time, the governor weights 147 are in their radially-outermost position, with the piston 110 of the valve 92 directing fluid to the front clutch, the governor sleeve or collar 144 will have moved to the right as far as the valve piston 110 will permit it to. (It will be noted that the rod 161 is provided with a collar 170 fixed thereto, which bears against a lever 173 engaged by a cam 171 fixed to a stationary portion of the transmission to provide a stop for the valve to prevent further movement of the piston 110 of the valve 92 to the left, and this stop, of course, will restrict the rotation of the lever 158 by the governor assembly.) The governor assembly and the shaft 142 have moved slightly to the left, leaving clearance at the right hand between the collar 144 and the sleeve 141. Upon pressing the accelerator beyond the detent, the shaft 142 and the governor weight assembly will be moved to the left, causing the front clutch valve 92 to cut off the pressure and to vent the clutch cylinder of the clutch 14 to the atmosphere, and the direct drive clutch piston 69 will be moved to the left (Fig. 10) to release the clutch to put the drive in second speed for added acceleration.

Referring to Fig. 19, the positions of the governor and accelerator mechanism there shown, illustrate in dotted lines the condition of this mechanism when the car is coasting in direct, and the accelerator is in its released position; the solid lines indicate the condition of this mechanism just after shifting from direct drive into first speed for engine braking. Referring to the dotted line positions of the mechanism, and assuming that the car is coasting in direct with the accelerator released, and it is desired to shift into first speed for engine braking purposes, the mechanism includes a device for insuring that the high speed clutch will be disengaged upon movement of the low speed gear 51 into mesh with the gear 55 to obtain low speed. For this purpose, the push rod 161 controlling the piston 110 of the direct drive clutch valve 92 is provided with a collar 170, as shown in Fig. 14 and Figs. 10, 15–19 inclusive, which is secured to the push rod 161, and, referring to Fig. 1, the rotatable lever 64 is provided with a cam 171 engageable with a raised portion 172 of a lever 173 pivoted at one end to the transmission casing. Upon rotation of the cam 171 by the lever 64 in shifting the collar 60 to engage the gear 50, the cam 171 will engage the raised projection 172 on the lever 173 to engage the outer end of the lever with the release collar 170 on the push rod 161, so that the movement of the lever 64 in obtaining first speed drive will directly and mechanically move the push rod 161 rearwardly, as shown in Figs. 10 and 19, to thus move the piston 110 of the valve 92 to its right-hand clutch-releasing position, prior to meshing the low speed gears. This feature is of considerable value in insuring that the front or direct drive clutch will be disengaged when the transmission is put in low gear. Thus, automatic release of the direct drive clutch is obtained whenever low speed is used by means of this mechanical connection, in which movement of the shift fork and synchronizer to disconnect the second speed gear 49 and the driven shaft and to engage the low speed gears causes the front clutch valve 92 to be closed. More particularly, to obtain low gear braking, low gear or first speed is obtained by moving the quadrant lever under the control of the driver to rotate the lever 62 to first release the rear clutch 15 and to move the synchronizer collar 60 to its neutral position, and thereafter to move the collar 60 to engage the gear 50 to obtain low speed, and subsequently moving the driver-operated shift lever to re-engage the rear clutch 15. Whenever the front clutch is engaged, the collar 170 will lie adjacent the cam lever 173, and it will be seen that a shift into low speed will cause the lever to move the governor assembly to the right against the light load of the governor shaft spring 151. Usually when shifting into low speed for engine braking, the driver has lifted his foot from the accelerator pedal and the condition of the control mechanism is as it appears in Fig. 19.

The governor accelerator control mechanism contemplates that additional linkage will be disposed between the accelerator and the carburetor to include a slip connection and a spring, so that, when the accelerator and transmission control linkage is at its wide-open carburetor throttle position, further depression of the accelerator to go through the detent 169 will merely slide this rod through the slip connection to compress the spring to permit overtravel of the accelerator pedal beyond its position for wide opening the carburetor throttle.

While the drawings illustrate a typical steam engine type of governor, it is contemplated that a bell crank type of governor may be utilized, as either type can be made to produce the same result, and, as shown, are functionally equal. In either case, it is desirable to have a variable ratio between the outward movement of the weights and the resulting axial compression of the governor spring. The ratio should diminish as the weights move out so as the radius to the center of gravity of the weights increases, the reduction in ratio, together with the increase in load as the spring compresses, will prevent the weights from flying out too suddenly. It is desirable that a slight increase in revolutions per minute of the engine takes place to cause each additional outward movement of the weights. Although definite car speeds of 16, 36 and 64 m.p.h. have been identified above in the description of the operation of the governor-accelerator controls, these speeds can be varied by suitable governor weight and spring combinations.

A feature of the invention is the disposition of all of the hydraulic control valves in the rear cover of the pump, which also contains all of the manifolds or passages for distribution of the oil or hydraulic fluid to the hydraulic torque converter and the clutches, and, it will be noted from an inspection of Fig. 1, that it is not necessary to provide pipes or cored passages anywhere else in the transmission. Only one pump is required, since no hydraulic pressure is required to engage the clutches for a push-start, for example, and it will be apparent that operation of the engine will cause the pump to be continuously effective to supply hydraulic fluid under pressure to the control valves.

A further feature of the hydraulic control system is that a minimum of four valves is required, which are of simple design, and all these valves are positioned in the rear cover of the pump with the cylinder bores for the valve pistons being parallel with the shaft axis, and with each bore going completely through the rear cover of the pump for easy machinability.

It is apparent that the transmission and its controls provide a low cost, simple, yet high performance unit. Due to the absence of bands, clutches running released in oil, and a rear pump, its inherent losses are much lower than automatic transmissions now available on the market, and it is to be noted that the hydraulic torque converter is not effective, and is locked out during establishment of direct drive, so that power losses in the transmission overall efficiency are most favorable. It is contemplated that the gear set be of the spur gear type, which permits the manufacturer to provide any desired speed ratios and variations thereof desired by the customer, and these gears are held at a total minimum of nine gears. It is also believed apparent that substantial savings in cost of transmissions are available, in that only one pump is needed for the hydraulic control system, and this could be omitted by utilizing the pump driven by the engine normally used for circulating lubricating fluid in the automobile engine. The valve block with only four valves as against 7 to 22 valves in automatic transmissions now on the market, and the valve block being integral with the pump rear cover and stator reaction shaft, provides a substantial savings in the cost of manufacture of transmissions.

While I have described my invention in connection with one specific embodiment thereof, it is to be understood that this is by way of illustration and not by way of limitation, and the scope of my invention is defined solely by the appended claims which should be construed as broadly as the prior art will permit.

I claim.

1. In an engine-driven transmission for a vehicle, a drive shaft connected to the engine; a driven shaft connected to the vehicle wheels; a sleeve shaft in telescoping relation to said driven shaft; a hydraulic torque converter comprising an impeller connected to the drive shaft, and a turbine connected to the sleeve shaft; a countershaft type gear set comprising a drive gear, a pair of gears rotatable on said driven shaft; a countershaft gear cluster including a driven gear meshing with said drive gear and a low speed gear meshing with one of said gears on the driven shaft; a second speed gear rotatable on said gear cluster meshing with the other of said gears on said driven shaft; a one-way clutch adapted to transmit rotation from said drive gear to said second speed gear and said other gear on said driven shaft, and a positive type clutch between said gears on said driven shaft and operable to selectively connect the same to said driven shaft to provide low and second speed ratios; a friction clutch connecting said sleeve shaft to said drive gear; a friction clutch for directly connecting said drive and driven shafts to provide a high speed drive; and a one-way clutch between said sleeve and driven shafts and operative to connect said sleeve and driven shafts during rotation of said driven shaft faster than said sleeve shaft and overrunning during rotation of said sleeve shaft faster than said driven shaft.

2. In a power transmission for driving a motor vehicle having an engine provided with a throttle and an accelerator for adjusting said throttle between open and closed positions; driving and driven shafts; a change speed transmission drivingly disposed between said shafts for providing relatively low, intermediate, and high speed power trains wherein the low speed power train includes a friction clutch, the intermediate speed power train includes said friction clutch and also an overrunning clutch of which a driven part is adapted to overrun a drive part during establishment and operation of the high speed power train, said low and intermediate speed power trains including a hydrodynamic coupling device and also positive clutch means actuatable selectively and alternatively to complete said low and intermediate speed power trains and controlled by a driver operable selector lever, and wherein said high speed power train is a friction coupling engageable to directly connect said drive and driven shafts; fluid pressure actuated motors for engaging said friction clutch and coupling; a source of fluid pressure for operating said motors; a valve controlling the supply of fluid from said fluid source to said motor for said friction clutch and including a spring yieldingly holding said valve in open position to direct fluid to said motor to effect engagement of said friction clutch; a second valve controlling the supply of fluid from said fluid source to said motor for said friction coupling and including a spring yieldingly holding said valve in closed position to disconnect said fluid source from said motor and to release the fluid pressure in said motor to disengage said friction coupling; a source of electric current; a solenoid including a movable core connected to said first-mentioned valve and energizable to move said valve to closed position to disengage said friction clutch; means for connecting said source of current to said solenoid to energize said core and including a switch in the driver operable selector lever adapted to be closed by the driver; driver operated control means mechanically connected to said core to move said core and thereby said first-mentioned valve to closed position to effect disengagement of said friction clutch during deenergization of said solenoid; and control means for said second valve including a governor responsive to the speed of the driven shaft and connected to said second valve to open said second valve to direct fluid to said friction coupling motor to engage said friction coupling at a predetermined value in the speed of the driven shaft; force means opposing the action of said governor; and means responsive to movement of said accelerator for varying the value at which said governor will operate said second valve.

3. In a power transmission for driving a motor vehicle having an engine provided with a throttle and an accelerator for adjusting said throttle between open and closed positions; driving and driven shafts; a change speed transmission drivingly disposed between said shafts for providing relatively low, intermediate, and high speed power trains wherein the low speed power train includes a friction clutch, the intermediate speed power train includes said friction clutch and also an overrunning clutch of which a driven part is adapted to overrun a drive part during establishment and operation of the high speed power train, said low and intermediate speed power trains including a hydrodynamic coupling device and also positive clutch means actuatable selectively and alternatively to complete said low and intermediate speed power trains and controlled by a driver operable selector lever, and wherein said high speed power train is a friction coupling engageable to directly connect said drive and driven shafts; fluid pressure actuated motors for engaging said friction clutch and coupling; a source of fluid pressure for operating said motors; a valve controlling the supply of fluid from said fluid source to said motor for said friction clutch and including a spring yieldingly holding said valve in open position to direct fluid to said motor to effect engagement of said friction clutch; a second valve controlling the supply of fluid from said fluid source to said motor for said friction coupling and including a spring yieldingly holding said valve in closed position to disconnect said fluid source from said motor and to release the fluid pressure in said motor to disengage said friction coupling; a source of electric current; a solenoid including a movable core connected to said first-mentioned valve and energizable to move said valve to closed position to disengage said friction clutch; means for connecting said source of current to said solenoid to energize said core and including a switch in the driver operable selector lever adapted to be closed by the driver; and control means for said second valve including a governor responsive to the speed of the driven shaft and connected to said second valve to open said second valve to direct fluid to said friction coupling motor to engage said friction coupling at a predetermined value in the speed of the driven shaft; force means opposing the action of said governor; and means responsive to movement of said accelerator for varying the value at which said governor will operate said second valve.

4. In a power transmission for driving a motor vehicle having an engine provided with a throttle and an accelerator for adjusting said throttle between open and closed positions; driving and driven shafts; a change speed transmission drivingly disposed between said shafts for providing relatively low, intermediate, and high speed power trains wherein the low speed power train includes a friction clutch, the intermediate speed power train includes said friction clutch and also an overrunning clutch of which a driven part is adapted to overrun a drive part during establishment and operation of the high speed power train, said low and intermediate speed power trains including a hydrodynamic coupling device and also a positive clutch means actuatable selectively and alternatively to complete said low and intermediate speed power trains and controlled by a driver operable selector lever, and wherein said high speed power train is a friction coupling engageable to directly connect said drive and driven shafts; fluid pressure actuated motors for engaging said friction clutch and coupling; a source of fluid pressure for operating said motors; a valve controlling the supply of fluid from said fluid source to said motor for said friction clutch and including a spring yieldingly holding said valve in open position to direct fluid to said motor to effect engagement of said friction clutch; a second valve controlling the supply of fluid from said fluid source to said motor for said friction coupling and including a spring yieldingly holding said valve in closed position to disconnect said fluid source from said motor and to release the fluid pressure in said motor to disengage said friction coupling; electro-magnetic means for moving said first-mentioned valve to closed position to disconnect said fluid source from said friction clutch motor and to release the fluid pressure therein to effect disengagement of said friction clutch; and control means for said second valve including a governor responsive to the speed of the driven shaft and connected to said second valve to open said second valve to direct fluid to said friction coupling motor to engage said friction coupling at a predetermined value in the speed of the driven shaft; force means opposing the action of said governor; and means responsive to movement of said accelerator for varying the value at which said governor will operate said second valve.

5. In a power transmission for driving a motor vehicle having an engine provided with a throttle and an accelerator for adjusting said throttle between open and closed positions; driving and driven shafts; a change speed transmission drivingly disposed between said shafts for providing relatively low, intermediate, and high speed power trains wherein the low speed power train includes a friction clutch, the intermediate speed power train includes said friction clutch and also an overrunning clutch of which a driven part is adapted to overrun a drive part during establishment and operation of the high speed power train, said low and intermediate speed power trains including a hydrodynamic coupling device and also positive clutch means actuatable selectively and alternatively to complete said low and intermediate speed power trains and controlled by a driver operable selector lever, and wherein said high speed power train is a friction coupling engageable to directly connect said drive and driven shafts; fluid pressure actuated motors for engaging said friction clutch and coupling; a source of fluid pressure for operating said motors; a valve controlling the supply of fluid from said fluid source to said motor for said friction clutch and including a spring yieldingly holding said valve in open position to direct fluid to said motor to effect engagement of said friction clutch; a second valve controlling the supply of fluid from said fluid source to said motor for said friction coupling and including a spring yieldingly holding said valve in closed position to disconnect said fluid source from said motor and to release the fluid pressure in said motor to disengage said friction coupling; means associated with said selector lever and operable at will for actuating said first-mentioned valve to closed position to effect disengagement of said friction clutch; a driver operated control, separate from said selector lever, operative at will for actuating said first-mentioned valve to closed position to effect disengagement of said friction clutch; and control means for said second valve including a governor responsive to the speed of the driven shaft and connected to said second valve to open said second valve to direct fluid to said friction coupling motor to engage said friction coupling at a predetermined value in the speed of the driven shaft; force means opposing the action of said governor; and means responsive to movement of said accelerator for varying the value at which said governor will operate said second valve.

6. In a power transmission for driving a motor vehicle having an engine provided with a throttle and an accelerator for adjusting said throttle between open and closed positions; a drive shaft connected to the engine; a driven shaft connected to the vehicle wheels; an intermediate shaft; a change speed transmission drivingly disposed between said intermediate and driven shafts for providing relatively low, intermediate, and high speed power trains wherein the low speed and intermediate speed power trains include gearing, and the intermediate speed power train also includes an overrunning clutch of which a driven part is adapted to overrun a drive part during establishment of the high speed power train, and wherein said high speed power train includes a friction coupling engageable for directly connecting said drive and driven shafts, a normally engaged friction clutch for connecting the intermediate shaft to the gearing, and positive clutch means actuatable selectively and alternatively to complete said low and intermediate power trains; a one-way engaging device between said intermediate and driven shafts and engageable when said driven shaft is rotated faster than said drive shaft, and releasable to disengage said intermediate and driven shafts when said intermediate shaft is rotated faster than said driven shaft; fluid pressure actuated motors for engaging said friction clutch and coupling; a source of fluid pressure for operating said motors; a valve controlling the supply of fluid from said fluid source to said motor for said friction clutch and including a spring yieldingly holding said valve in open position to direct fluid to said motor to effect engagement of said friction clutch; a second valve controlling the supply of fluid from said fluid source to said motor for said friction coupling and including a spring yieldingly holding said valve in closed position to disconnect said fluid source from said motor and to release the fluid pressure in the motor to disengage said friction coupling; driver operable control means for moving said first-mentioned valve to closed position to effect disengagement of said friction clutch; and control means for said second valve including a governor responsive to the speed of the driven shaft and connected to said second valve to open said second valve to direct fluid to said friction coupling motor to engage said friction coupling at a predetermined value in the speed of the driven shaft; force means opposing the reaction of said governor; and means responsive to movement of said accelerator for varying the value at which said governor will operate said second valve.

7. In a power transmission for driving a motor vehicle; a drive shaft connected to the engine; a driven shaft connected to the vehicle wheels; an intermediate shaft; a change speed transmission drivingly disposed between said intermediate and driven shafts for providing relatively low, intermediate, and high speed power trains wherein the low speed and intermediate speed power trains include gearing, and the intermediate speed power train also includes an overrunning clutch of which a driven part is adapted to overrun a drive part during establishment of the high speed power train, and wherein said high speed power train includes a friction coupling engageable for directly connecting said drive and driven shafts, and a normally engaged friction clutch for connecting the intermediate shaft to the gearing, and positive clutch means actuatable selectively and alternatively to complete said low and intermediate power trains; a one-way engaging device between said intermediate and driven shafts and engageable when said driven shaft is rotated faster than said drive shaft, and releasable to disengage said intermediate and driven shafts when said intermediate shaft is rotated faster than said driven shaft; driver operable control means for disengaging said friction clutch; and control means for engaging said friction clutch including speed responsive means and driver operable means for controlling the operation of said speed responsive means.

8. In a power transmission for driving a motor vehicle; a drive shaft connected to the engine; a driven shaft connected to the vehicle wheels; an intermediate shaft; a change speed transmission drivingly disposed between said intermediate and driven shafts for providing relatively low, intermediate, and high speed power trains wherein the low speed and intermediate speed power trains include gearing, and the intermediate speed power train also includes an overrunning clutch of which a driven part is adapted to overrun a drive part during establishment of the high speed power train, and wherein said high speed power train includes a friction coupling engageable for directly connecting said drive and driven shafts, and a normally engaged friction clutch for connecting the intermediate shaft to the gearing, and positive clutch means actuatable selectively and alternatively to complete said low and intermediate power trains; a one-way engaging device between said intermediate and driven shafts and engageable when said driven shaft is rotated faster than said drive shaft, and releasable to disengage said intermediate and driven shafts when said intermediate shaft is rotated faster than said driven shaft; and means for controlling engagement and disengagement of said friction clutch; and means for controlling engagement and disengagement of said friction coupling.

9. In a power transmission for driving a motor vehicle having an engine provided with a throttle and an accelerator for adjusting said throttle between open and closed positions, driving and driven shafts; a change speed transmission drivingly disposed between said shafts for providing relatively low and high speed power trains wherein the low speed power train includes an overrunning clutch of which a driven part is adapted to overrun a drive part during establishment and operation of the high speed ratio train, said low speed power train including a friction clutch, and said high speed power train including a friction coupling for directly connecting said drive and driven shafts; fluid pressure actuated motors for engaging said friction clutch and coupling; a source of fluid pressure for operating said motors; a valve controlling the supply of fluid from said fluid source to said motor for said friction clutch and including a spring yieldingly holding said valve in open position to direct fluid to said motor to effect engagement of said friction clutch; a second valve controlling the supply of fluid from said fluid source to said motor for said friction coupling and including a spring yieldingly holding said valve in closed position to disconnect said fluid source from said motor and to release the fluid pressure in said motor to disengage said friction coupling; electromagnetic means for moving said first-mentioned valve to closed position to disconnect said fluid source from said friction clutch motor and to release the fluid pressure therein to effect disengagement of said friction clutch; and control means for said second valve including a governor responsive to the speed of the driven shaft and connected to said second valve to open said second valve to direct fluid to said friction coupling motor to engage said friction coupling at a predetermined value in the speed of the driven shaft; force means opposing the action of said governor; and means responsive to movement of said accelerator for varying the value at which said governor will operate said second valve.

10. In a power transmission for driving a motor vehicle having an engine provided with a throttle and an accelerator for adjusting said throttle between open and closed positions; driving and driven shafts; a change speed transmission drivingly disposed between said shafts for providing relatively low and high speed power trains wherein the low speed power train includes an overrunning clutch of which a driven part is adapted to overrun a drive part during establishment and operation of the high speed ratio train, said low speed power train including a friction clutch, and said high speed power train including a friction coupling for directly connecting said drive and driven shafts; fluid pressure actuated motors for engaging said friction clutch and coupling; a source of fluid pressure for operating said motors; a valve controlling the supply of fluid from said fluid source to said motor for said friction clutch and including a spring yieldingly holding said valve in open position to direct fluid to said motor to effect engagement of said friction clutch, a second valve controlling the supply of fluid from said fluid source to said motor for said friction coupling and including a spring yieldingly holding said valve in closed position to disconnect said fluid source from said motor and to release the fluid pressure in said motor to disengage said friction coupling; means including a driver operable lever and operable at will for actuating said first-mentioned valve to closed position to effect disengagement of said friction clutch; a driver operated control, separate from said lever, operative at will for actuating said first-mentioned valve to closed position to effect disengagement of said friction clutch; and control means for said second valve including a governor responsive to the speed of the driven shaft and connected to said second valve to open said second valve to direct fluid to said friction coupling motor to engage said friction coupling at a predetermined value in the speed of the driven shaft; force means opposing the action of said governor; and means responsive to movement of said accelerator for varying the value at which said governor will operate said second valve.

11. In a power transmission for a vehicle and having a throttle for the engine controlled by a driver-operable accelerator, the combination of a drive member connected to the engine; a driven member connected to the vehicle wheels; a casing rotatably supporting said members; means in said casing and providing a plurality of power trains between said members of different speed ratios, one of said power trains including a hydraulic torque converter and a hydraulically-operated clutch, and the other of said power trains including a hydraulically-operated clutch; a pump for providing a source of fluid under pressure to said converter and for operating said clutches and having a housing connected to said casing; a valve connected to said pump for limiting the pressure of fluid from the pump to a predetermined maximum; a second valve in series with said first-named valve and connecting said pump to said converter and for regulating the pressure of fluid from the first-named valve to a predetermined maximum; a third valve in series with said first-named valve and having different positions for connecting said pump to and disconnecting said pump from said first-named clutch for effecting engagement and disengagement of said first-named clutch; a fourth valve in one position thereof connecting said pump with said second-named clutch for engaging said clutch, said pump housing containing all of said valves and manifolds for hydraulic pressure fluid distribution from said pump to said valves; driver-operable means controlling operation of said third-named valve to connect and disconnect said pump relative to said first-named clutch; speed-responsive means connected to said driven member and operative to move said fourth-named valve to connect said pump to said second-named clutch to engage said second-named clutch at a predetermined value in the speed of said driven member; force means opposing the action of said speed-responsive means; and means responsive to operation of said accelerator for assisting said force means to vary the value of said force means to cause the change in the value at which said speed-responsive means will automatically effect operation of said third-named valve to engage said second-named clutch.

12. In a power transmission, the combination of a drive member; a driven member; a casing rotatably supporting said members; means in said casing and providing a plurality of power trains between said members of different speed ratios, one of said power trains including a hydraulic torque converter and a hydraulically-operated clutch, and the other of said power trains including a hydraulically-operated clutch; a pump for providing a source of fluid under pressure to said converter and for operating said clutches and having a housing connected to said casing; a valve connected to said pump for limiting the pressure of fluid from the pump to a predetermined maximum; a second valve in series with said first-named valve and connecting said pump to said converter and for regulating the pressure of fluid from the first-named valve to a predetermined maximum; a third valve in series with said first-named valve and having different positions for connecting said pump to and disconnecting said pump from said first-named clutch for effecting engagement and disengagement of said first-named clutch; a fourth valve in one position thereof connecting said pump with said second-named clutch for engaging said clutch, said pump housing containing all of said valves and manifolds for hydraulic pressure fluid distribution from said pump to said valves, and means for controlling operation of said third-named and fourth-named valves.

13. In a power transmission for driving a motor vehicle, driving and driven shafts; a change speed transmission drivingly disposed between said shafts for providing relatively low and high speed power trains, said low speed power train including a gear set; driver-operable means mechanically connected to and controlling said gear set for rendering said low speed power train operative and inoperative; means for establishing said high speed power train; control means for said high speed power train establishing means; a governor responsive to the speed of one of said shafts; means mechanically connecting said governor to said control means to effect operation thereof by said governor at a predetermined speed of said one shaft to render operative said high speed power train establishing means; and mechanism engageable with said mechanical connecting means and connected to and operable by said driver-operable means to move said connecting means and thereby said control means, in opposition to the operation of said governor to retain said control means in its high speed power train establishing position, to render inoperative said high speed power train during movement of said driver-operable means to effect operation of said gear set to render operative said low speed power train.

14. In a power transmission for driving a motor vehicle, driving and driven shafts; a change speed transmission drivingly disposed between said shafts for providing relatively low and high speed power trains; means for establishing said low speed power train; driver-operable means mechanically connected to and controlling said establishing means for rendering said low speed power train operative and inoperative; fluid pressure-operated means for establishing said high speed power train; a source of fluid pressure; a valve between said source and said fluid pressure operated means and operable to an open position to connect said source and said fluid pressure-operated means to establish said high speed power train and to a closed position to disconnect said source from said fluid pressure-operated means to render inoperative said high speed power train; a governor responsive to the speed of one of said shafts; means mechanically connecting said governor to said valve to effect operation thereof from a closed position to an open position by said governor at a predetermined speed of said one shaft; and means engageable with said mechanical connecting means and mechanically connected to and operable by said driver-operable means to move said connecting means and thereby said valve to its closed position, in opposition to the operation of said governor to retain said valve in its open position, to render said high speed power train inperative during movement of said driver-operable means to actuate said low speed power train establishing means to render operative said low speed power train.

15. In a transmission, driving and driven shafts; means including a gear set for providing a low speed power train between said shafts; driver-operable means mechanically connected to and controlling said gears of said gear set for rendering said low speed power train operative and inoperative; means for providing a high speed power train between said shafts; fluid pressure-operated means for establishing said high speed power train; a source of fluid pressure; a valve between said source and said fluid pressure operated means and operable to an open position to connect said source and said fluid pressure-operated means to establish said high speed power train and to a closed position to disconnect said source from said fluid pressure-operated means to render inoperative said high speed power train; force means for moving said valve to its open position; and means including a lever connectible to and rotatable by said driver-operable means to move said valve to is closed position, in opposition to the operation of said force means to retain said valve in its open position, to render said high speed power train inoperative during movement of said driver-operable means to drivingly connect said gears to render operative said low speed power train.

16. In a transmission, driving and driven shafts; means including meshable gears for providing a low power train between said shafts; means including a clutch for providing a high speed power train between said shafts; driver-operable means mechanically connected to and controlling said meshable gears for rendering said low speed power train operative and inoperative; fluid pressure-operated means for engaging said clutch for establishing said high speed power train; a source of fluid pressure; a valve between said source and said fluid pressure operated means and operable to an open position to connect said source and said fluid pressure-operated means to establish said high speed power train and to a closed position to disconnect said source from said fluid pressure-operated means to render inoperative said high speed power train; and mechanical means connected to and operable by said driver-operable means to move said valve from its open position to its closed position, to render said high speed power train inoperative during movement of said driver-operable means to mesh said gears to render operative said low speed power train.

17. In a power transmission for driving a motor vehicle having an engine provided with a throttle and an accelerator for adjusting said throttle between open and closed positions; driving, intermediate and driven shafts in axial alignment; a change speed transmission drivingly disposed between said shafts for providing relatively intermediate, low and high speed power trains; said low speed power train including a friction clutch disposed between said intermediate and driven shafts and operative to effect an interconnection therebetween, said intermediate speed power train also including said friction clutch and further including an overrunning clutch in series with said friction clutch during the operation of said intermediate speed power train; a hydrodynamic coupling device disposed between said driving and intermediate shafts effective to transmit torque therebetween during the operation of said low and intermediate speed power trains, clutch means in series with said friction clutch during the operation of said low and intermediate speed power trains, manually operable means for operating said clutch means, a friction coupling in parallel with said hydrodynamic coupling device engageable to connect said drive and driven shafts directly to provide said high speed power train, means for effecting engagement of said friction coupling, means associated with said manually operable means operable to effect disengagement of said friction clutch, and second manually operable means, separate from said first mentioned manually operable means, also effective to disengage said friction clutch.

18. A transmission including a drive member, hydrodynamic coupling means adapted to be driven by said drive member, a driven shaft, a shaft intermediate said coupling means and said driven shaft connected to said coupling means, means bypassing said hydrodynamic coupling means operable to connect directly said drive member and said driven shaft, means to transmit drive from said intermediate shaft to said driven shaft including means operable to effect such drive and disengageable to release such drive, and a one way clutch between said driven and intermediate shafts effective to transmit drive from said driven shaft to said intermediate shaft when said operable means and said bypassing means are inoperative.

19. In an engine-driven transmission for a vehicle, a drive member connected to the engine, hydrodynamic coupling means driven by said drive member, a driven shaft connected to the vehicle wheels, an intermediate shaft connecting said coupling means and said driven shaft, means including a clutch to transmit drive from said intermediate shaft to said driven shaft, and means providing a push-start for said vehicle including a one-way clutch between said driven and intermediate shafts effective to transmit drive from said driven shaft through said intermediate shaft and through said hydrodynamic coupling means to start the engine when said clutch means is disengaged, said one-way clutch being ineffective to transmit a drive from the engine to the driven shaft after the engine has been started.

20. A transmission including a drive member, hydrodynamic coupling means driven by said drive member, a driven shaft, an intermediate shaft connecting said coupling means including a clutch and a variable speed gear set to transmit drive from said intermediate shaft to said driven shaft, said clutch being disengaged when said gear set is in neutral condition, and means providing a push-start for said vehicle including a one-way clutch between said driven and intermediate shafts effective to transmit drive from said driven shaft through said intermediate shaft and through said coupling means to start the engine when said gear set is in neutral condition and said clutch means is disengaged, said one-way clutch being ineffective to transmit drive from the engine to the driven shaft after the engine has been started.

References Cited in the file of this patent

UNITED STATES PATENTS

| | | |
|---|---|---|
| Re. 24,122 | Randol | Feb. 21, 1956 |
| 1,911,599 | Bloxsom | May 30, 1933 |
| 2,105,625 | Wichtendahl | Jan. 18, 1938 |
| 2,189,679 | Sanford | Feb. 6, 1940 |
| 2,191,669 | Kress | Feb. 27, 1940 |
| 2,352,212 | Lang et al. | June 27, 1944 |
| 2,430,799 | Aspinwall | Nov. 11, 1947 |
| 2,568,958 | Hey et al. | Sept. 25, 1951 |
| 2,625,057 | Kelbel | Jan. 13, 1953 |
| 2,695,696 | Iavelli | Nov. 30, 1954 |
| 2,713,798 | Herndon | July 26, 1955 |
| 2,757,746 | Biedess | Aug. 7, 1956 |

UNITED STATES PATENT OFFICE
CERTIFICATE OF CORRECTION

Patent No. 2,950,630                          August 30, 1960

Reinhold C. Zeidler

It is hereby certified that error appears in the printed specification of the above numbered patent requiring correction and that the said Letters Patent should read as corrected below.

Column 4, line 72, for "on" read -- of --; column 9, line 6, for "84" read -- 83 --; line 30, for "compession" read -- compression --; column 10, line 16, for "passage", second occurrence, read -- passages --; column 24, line 6, for "inperative" read -- inoperative --; line 27, for "is closed" read -- its closed --.

Signed and sealed this 4th day of April 1961

(SEAL)
Attest: ERNEST W. SWIDER

~~XXXXXXXXXXX~~
~~KARL H. AXLINE~~
Attesting Officer

ARTHUR W. CROCKER
Acting Commissioner of Patents